(12) United States Patent
Shroff et al.

(10) Patent No.: US 11,816,219 B2
(45) Date of Patent: Nov. 14, 2023

(54) BINDING A TRUST ANCHOR AND AN ASIC

(71) Applicant: Cisco Technology, Inc., San Jose, CA (US)

(72) Inventors: Chirag Shroff, Cary, NC (US); David McGrew, Poolesville, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 17/335,156

(22) Filed: Jun. 1, 2021

(65) Prior Publication Data

US 2022/0382866 A1    Dec. 1, 2022

(51) Int. Cl.
*H04L 9/32* (2006.01)
*G06F 21/76* (2013.01)
(Continued)

(52) U.S. Cl.
CPC ............ *G06F 21/57* (2013.01); *H04L 9/0869* (2013.01); *G06F 2221/034* (2013.01)

(58) Field of Classification Search
CPC ............... G06F 21/57; G06F 2221/034; G06F 2221/2103; G06F 21/76; G06F 21/44;
(Continued)

(56) References Cited

U.S. PATENT DOCUMENTS 9,959,493 B2   5/2018 Adkins et al.
11,544,677 B2 * 1/2023 Vagare .................. H04L 9/0866
(Continued)

FOREIGN PATENT DOCUMENTS

AU    2004201740 A1 *  5/2004  ............ G06F 21/44
AU    2004201740 A1     5/2004
(Continued)

OTHER PUBLICATIONS

Reconfigurable trusted computing in hardware; See discussions, stats, and author profiles for this publication at: https://www.researchgate.net/publication/221609772; Conference Paper • Jan. 2007.
(Continued)

*Primary Examiner* — Joseph P Hirl
*Assistant Examiner* — Aayush Aryal
(74) *Attorney, Agent, or Firm* — Baker Botts L.L.P.

(57) ABSTRACT

According to certain embodiments, a method comprises performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and determining whether the hardware component is authorized to run on the product based at least in part on whether the trust anchor receives, from the hardware component, a response encrypted using the random value (K). The method further comprises allowing or preventing the hardware component from running on the product based on whether the hardware component is authorized to run on the product.

19 Claims, 5 Drawing Sheets

(51) Int. Cl.
*G06F 21/44* (2013.01)
*G06F 21/57* (2013.01)
*H04L 9/08* (2006.01)

(58) Field of Classification Search
CPC . H04L 9/0869; H04L 9/3234; H04L 2209/12; H04L 9/3271
See application file for complete search history.

(56) References Cited

U.S. PATENT DOCUMENTS

| | | | |
|---|---|---|---|
| 2008/0258864 A1* | 10/2008 | Hattori | H04B 5/02 340/5.8 |
| 2011/0060947 A1 | 3/2011 | Song et al. | |
| 2013/0019105 A1* | 1/2013 | Hussain | H04L 9/32 713/189 |
| 2013/0097663 A1 | 4/2013 | Finger et al. | |
| 2014/0032907 A1 | 1/2014 | Smith et al. | |
| 2014/0064480 A1 | 3/2014 | Hartley et al. | |
| 2015/0095631 A1 | 4/2015 | Rahardjo et al. | |
| 2015/0319150 A1 | 11/2015 | Smith et al. | |
| 2016/0006735 A1 | 1/2016 | La Fever et al. | |
| 2016/0048462 A1 | 2/2016 | O'Loughlin et al. | |
| 2016/0171223 A1 | 6/2016 | Covey et al. | |
| 2016/0245862 A1 | 8/2016 | Grieco et al. | |
| 2016/0247002 A1 | 8/2016 | Grieco et al. | |
| 2017/0250827 A1 | 8/2017 | Opschroef et al. | |
| 2019/0050601 A1 | 2/2019 | Zeh et al. | |
| 2020/0021447 A1 | 1/2020 | Ih et al. | |
| 2020/0228351 A1 | 7/2020 | Kreft | |
| 2020/0228388 A1 | 7/2020 | Schulz et al. | |
| 2020/0322176 A1* | 10/2020 | Bhandari | G06F 21/57 |

FOREIGN PATENT DOCUMENTS

| | | | | |
|---|---|---|---|---|
| CN | 108768963 A | | 11/2018 | |
| EP | 2854063 A1 | * | 4/2015 | .......... B41J 2/17546 |
| EP | 2854063 A1 | | 4/2015 | |

OTHER PUBLICATIONS

Electronic Chip ID, FPGA Security FPGA anti-counterfeit technology, Device DNA, Silicon ID; https://www.intellitech.com/ic/; 2 pages; 60 Rochester Hill Rd, Rochester, NH 03867, U.S.A. Tel: (603 )403-8030 Copyright© 1997-2021 Intellitech Corporation. All rights reserved.
Advanced Modes in AES: Are they Safe from Power Analysis based Side Channel Attacks?; https://ieeexplore.ieee.org/abstract/document/6974678; Published in: 2014 IEEE 32nd International Conference on Computer Design (ICCD).
International Search Report and Written Opinion corresponding to PCT/US2022/072456 dated Sep. 9, 2022, 12 pages.

* cited by examiner

BINDING A TRUST ANCHOR AND AN ASIC

TECHNICAL FIELD

The present disclosure generally relates to hardware security, and more specifically to binding hardware, such as an ASIC, to a trust anchor.

BACKGROUND

An application-specific integrated circuit (ASIC) generally refers to an integrated circuit designed for a specific purpose. An ASIC tends to be quite efficient at performing the specific purpose for which it was designed—as opposed to general-purpose circuits, like General Processing Units (GPUs) or Central Processing Units (CPUs), which can perform many different functions, but often less efficiently. A product may include a number of ASICs. As one example, the product could be a switch or a router that includes different ASICs to support different protocols. Other ASICs could be included for other purposes.

DESCRIPTION OF EXAMPLE EMBODIMENTS

Overview

Figure 1:
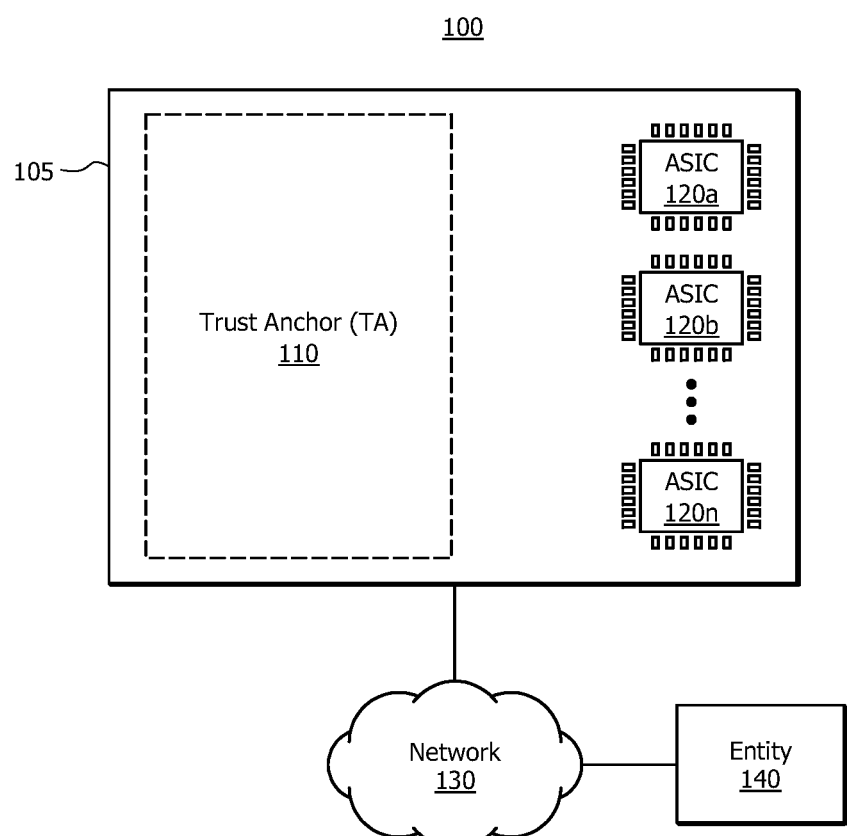
FIG. 1 illustrates an example of a system, in accordance with certain embodiments.

According to an embodiment, a system comprises one or more processors and one or more computer-readable non-transitory storage media comprising instructions that, when executed by the one or more processors, cause one or more components of the system to perform operations. The operations comprise performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and determining whether the hardware component is authorized to run on the product based at least in part on whether the trust anchor receives, from the hardware component, a response encrypted using the random value (K). The operations further comprise allowing or preventing the hardware component from running on the product based on whether the hardware component is authorized to run on the product.

According to another embodiment, a method comprises performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and determining whether the hardware component is authorized to run on the product based at least in part on whether the trust anchor receives, from the hardware component, a response encrypted using the random value (K). The method further comprises allowing or preventing the hardware component from running on the product based on whether the hardware component is authorized to run on the product.

According to yet another embodiment, one or more computer-readable non-transitory storage media may embody instructions that, when executed by a processor, cause the performance of operations. The operations comprise performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and determining whether the hardware component is authorized to run on the product based at least in part on whether the trust anchor receives, from the hardware component, a response encrypted using the random value (K). The operations further comprise allowing or preventing the hardware component from running on the product based on whether the hardware component is authorized to run on the product.

According to an embodiment, a system comprises one or more processors and one or more computer-readable non-transitory storage media comprising instructions that, when executed by the one or more processors, cause one or more components of the system to perform operations. The operations comprise receiving an encrypted value from a trust anchor. The encrypted value is received by a hardware component, and the encrypted value is associated with a posture assessment in which the trust anchor determines whether the hardware component is authorized to run on a product. The operations further comprise obtaining a random value (K) based on decrypting the encrypted value. The decrypting uses a long-term key associated with the hardware component. The operations further comprise communicating an encrypted response to the trust anchor. The encrypted response is encrypted using the random value (K). The encrypted response enables the trust anchor to determine whether the hardware component is authorized to run on the product.

According to another embodiment, a method comprises receiving an encrypted value from a trust anchor. The encrypted value is received by a hardware component, and the encrypted value is associated with a posture assessment in which the trust anchor determines whether the hardware component is authorized to run on a product. The method further comprises obtaining a random value (K) based on decrypting the encrypted value. The decrypting uses a long-term key associated with the hardware component. The method further comprises communicating an encrypted response to the trust anchor. The encrypted response is encrypted using the random value (K). The encrypted response enables the trust anchor to determine whether the hardware component is authorized to run on the product.

According to yet another embodiment, one or more computer-readable non-transitory storage media may embody instructions that, when executed by a processor, cause the performance of operations. The operations comprise receiving an encrypted value from a trust anchor. The encrypted value is received by a hardware component, and the encrypted value is associated with a posture assessment in which the trust anchor determines whether the hardware component is authorized to run on a product. The operations further comprise obtaining a random value (K) based on decrypting the encrypted value. The decrypting uses a long-term key associated with the hardware component. The operations further comprise communicating an encrypted response to the trust anchor. The encrypted response is encrypted using the random value (K). The encrypted response enables the trust anchor to determine whether the hardware component is authorized to run on the product.

According to an embodiment, a system comprises one or more processors and one or more computer-readable non-transitory storage media comprising instructions that, when executed by the one or more processors, cause one or more components of the system to perform operations. The operations comprise determining a random value (K), encrypting the random value (K) using a long-term key associated with a hardware component in order to yield an encrypted value, communicating the encrypted value to the hardware component, and receiving a response encrypted using the random value (K). The response is received from the hardware component. The operations further comprise encrypting a schema using the random value (K) and sending the encrypted schema to the hardware component. The schema indicates functionality that the hardware component is authorized to enable.

According to another embodiment, a method performed by a trust anchor comprises determining a random value (K), encrypting the random value (K) using a long-term key associated with a hardware component in order to yield an encrypted value, communicating the encrypted value to the hardware component, and receiving a response encrypted using the random value (K). The response is received from the hardware component. The method further comprise encrypting a schema using the random value (K) and sending the encrypted schema to the hardware component. The schema indicates functionality that the hardware component is authorized to enable.

According to yet another embodiment, one or more computer-readable non-transitory storage media may embody instructions that, when executed by a processor, cause the performance of operations. The operations comprise determining a random value (K), encrypting the random value (K) using a long-term key associated with a hardware component in order to yield an encrypted value, communicating the encrypted value to the hardware component, and receiving a response encrypted using the random value (K). The response is received from the hardware component. The operations further comprise encrypting a schema using the random value (K) and sending the encrypted schema to the hardware component. The schema indicates functionality that the hardware component is authorized to enable.

According to an embodiment, a system comprises one or more processors and one or more computer-readable non-transitory storage media comprising instructions that, when executed by the one or more processors, cause one or more components of the system to perform operations. The operations comprise performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and receiving, from the hardware component, a message encrypted using the random value (K). The message comprises an identifier associated with the hardware component. Performing the posture assessment further comprises determining whether the hardware component is authorized to run on the product based at least in part on the identifier associated with the hardware component. The operations further comprise performing an action that depends on whether the hardware component is authorized to run on the product.

According to another embodiment, a method comprises performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and receiving, from the hardware component, a message encrypted using the random value (K). The message comprises an identifier associated with the hardware component. Performing the posture assessment further comprises determining whether the hardware component is authorized to run on the product based at least in part on the identifier associated with the hardware component. The method further comprises performing an action that depends on whether the hardware component is authorized to run on the product.

According to yet another embodiment, one or more computer-readable non-transitory storage media may embody instructions that, when executed by a processor, cause the performance of operations. The operations comprise performing a posture assessment at a trust anchor in order to determine whether a hardware component is authorized to run on a product. Performing the posture assessment comprises determining a random value (K), encrypting the random value (K) using a long-term key associated with the hardware component in order to yield an encrypted value, communicating the encrypted value to the hardware component, and receiving, from the hardware component, a message encrypted using the random value (K). The message comprises an identifier associated with the hardware component. Performing the posture assessment further comprises determining whether the hardware component is authorized to run on the product based at least in part on the identifier associated with the hardware component. The operations further comprise performing an action that depends on whether the hardware component is authorized to run on the product.

Technical advantages of certain embodiments of this disclosure may include one or more of the following. Certain embodiments increase security and protect a product from gray market modifications. Certain embodiments provide the increased security while avoiding putting undue burden on the ASICs to perform advanced security and/or cryptographic features. In this manner, the ASICs retain capacity to perform their usual product-related functionality. Certain embodiments provide the increased security while avoiding costs that would otherwise be required to add a trust anchor to every ASIC.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

A product, such as a switch, a router, or other product comprising hardware, may include a number of ASICs. It can be difficult to verify that each ASIC is authorized for use in the product. For example, a typical ASIC, by itself, has very limited cryptographic capability, making it difficult to authenticate the ASIC. This leaves products vulnerable to certain types of counterfeiting or gray market modifications. For example, a supply chain attack might try to add an unauthorized third party ASIC (an ASIC acquired outside of the product manufacturer's control) to the product manufacturer's base product in order to create a gray market product.

One way of securing a product is to use a trust anchor. A trust anchor comprises tamper-resistant hardware configured to perform cryptography. As an example, the trust anchor may determine to send data to a recipient, encrypt the data using a public key associated with the recipient, and send the encrypted data to the recipient. As another example, the trust anchor may receive data that has been encrypted using a public key associated with the trust anchor, and the trust anchor may decrypt the encrypted data using a private key associated with the trust anchor. The trust anchor may support signatures to facilitate public key encryption. Although using a trust anchor improves security, it is not practical to put a trust anchor in every piece of hardware (e.g., every ASIC). Putting a trust anchor in every piece of hardware would increase costs and would use capacity of the ASIC that could otherwise be used for the ASIC's usual product-related functionality.

Certain embodiments of the present disclosure provide solutions to these and other problems, as further described with reference to FIGS. 1-6. FIG. 1 illustrates an example of a system 100, in accordance with certain embodiments. System 100 includes a product 105 comprising a trust anchor 110 and one or more ASICs 120a-n. In certain embodiments, a manufacturer of product 105 issues a certificate to trust anchor 110 to establish that the manufacturer trusts the trust anchor 110. For example, trust anchor 110 may be an authoritative entity for which trust is assumed (rather than derived) based on trust anchor 110 having been issued a root certificate. In general, trust anchor 110 performs a posture assessment of an ASIC 120 to ensure that the manufacturer has authorized ASIC 120 to be used in product 105. Trust anchor 110 can perform the posture assessment at any suitable time in order to verify ASIC 120. Additionally, trust anchor 110 can perform any suitable number of posture assessments in order to verify any suitable number of ASICs 120, such as all ASICs 120a-n of product 105 or a subset of ASICs 120a-n (e.g., a subset of ASICs 120 that the manufacturer considers important to verify based on vulnerability of ASIC 120 to gray market modifications, cost of ASIC 120, functionality performed by ASIC 120, whether ASIC 120 has previously passed a posture assessment, and/or other factors).

In certain embodiments, system 100 further comprises network 130 and entity 140. Network 130 generally represents any suitable network that facilitates communication between components of system 100, such as communication between product 105 and entity 140. Entity 140 may be external to product 105. In certain embodiments, entity 140 may be associated with the manufacturer of product 105. As an example, entity 140 may comprise a cloud-based hardware security module ("HSM") of the manufacturer. In certain embodiments, the HSM facilitates secure communication between trust anchor 110 and ASIC 120. For example, the HSM safeguards and manages digital keys and performs cryptographic functions. HSM may perform other functionality related to security, such as triggering posture assessments.

Each ASIC 120 has its own long-term key (LTK). As an example, the LTK may be a symmetric key burned into ASIC 120 during manufacturing or created using physical unclonable function (PUF) technology. This LTK can be used to secure communication between ASIC 120 and trust anchor 110. ASIC 120 uses key-based encryption to decrypt and authenticate messages from trust anchor 110. Similarly, trust anchor 110 uses key-based encryption to decrypt and authenticate messages from ASIC 120.

Trust anchor 110 learns ASIC 120's LTK in a manner that protects the security of the LTK. When providing ASIC 120's LTK to trust anchor 110, certain embodiments encrypt ASIC 120's LTK using trust anchor 110's public key to minimize exposure of the LTK. Certain embodiments provide trust anchor 110 with ASIC 120's LTK during manufacturing. Other embodiments provide trust anchor 110 with ASIC 120's LTK at a later time. As an example, ASIC 120 can generate its LTK at a later time and can communicate the LTK to trust anchor 110 via an HSM (e.g., entity 140). In certain embodiments, ASIC 120 encrypts its LTK using a public key of the HSM and sends the encrypted LTK to the HSM. The HSM decrypts the LTK using the private key of the HSM and re-encrypts the LTK using the public key of trust anchor 110 corresponding to the product 105 that the manufacture authorizes to run ASIC 120. The HSM sends the re-encrypted LTK to trust anchor 110. Trust anchor 110 stores ASIC 120's LTK for use during future posture assessments of ASIC 120. Provisioning trust anchor 110 with ASIC 120's LTK binds ASIC 120 to the manufacturer of product 105 because the trust anchor 110 associated with/ trusted by the manufacturer can authenticate ASIC 120 and can communicate with the manufacturer, for example, via public key cryptography.

Trust anchor 120 determines when a posture assessment has been triggered. For example, the posture assessment may be triggered at boot time of product 105, in response to a demand by product 105's Operating System (OS), in response to detecting that an ASIC 120 has been changed or added to product 120, or in response to a demand by entity 140. As discussed above, entity 140 may comprise an HSM associated with the manufacturer of product 105, and entity 140 may be configured to initiate a posture assessment in order to take an inventory of all ASICs 120 on product 105 to confirm that the manufacturer has authorized ASICs 120 for use with product 105. In certain embodiments, the posture assessment comprises the following steps:

Step 1: Trust anchor 110 creates a random value (K) unique to that posture assessment. For example, for a posture assessment triggered at boot time, the random value (K) would be unique to that boot session. This random value (K) will be used when encrypting and decrypting communications between trust anchor 110 and ASIC 120 for the posture assessment (e.g., during the current boot cycle/demand). Different posture assessments can use different random values K to better protect the LTK from side-channel attacks.

Step 2: Trust anchor 110 encrypts random value (K) using ASIC 120's LTK to yield ciphertext C. In certain embodiments, ciphertext C corresponds to an Authenticated Encryption with Associated Data (AEAD)

encrypted version of random value (K) encrypted using ASIC 120's LTK. That is, $C=\text{AEAD-ENC}_{LTK}(K)$.

Step 3: Trust anchor 110 sends ciphertext C to ASIC 120.

Step 4: ASIC 120 receives ciphertext C sent by trust anchor 110 in step 3.

Step 5: ASIC 120 determines random value (K) based on ciphertext C. Because ASIC 120 knows its own LTK, it is able to decrypt ciphertext C to determine random value (K). Continuing with the example of step 2 where $C=\text{AEAD-ENC}_{LTK}(K)$, ASIC 120 determines that $K=\text{AEAD-DEC}_{LTK}(C)$.

Step 6: Trust anchor 110 and ASIC 120 communicate using random value (K). Note that trust anchor 110 detects a problem with ASIC 120 if ASIC 120 is unable to communicate using random value (K). For example, if a counterfeiter replaced the correct ASIC 120 with an unauthorized ASIC 120, the unauthorized ASIC 120 would not know the LTK of the correct ASIC 120. Without the correct LTK, the unauthorized ASIC 120 would not be able to decrypt the random value (K) for communicating with trust anchor 110.

Once both trust anchor 110 and ASIC 120 have the same random value (K), all communications exchanged during the posture assessment (such as during the boot cycle) can be encrypted and decrypted based on the random value (K). As an example, ASIC 120 may send trust anchor 110 information like ASIC 120's serial number, electronic chip identifier (ECID), and/or product identifier encrypted using random value (K), and trust anchor 110 may decrypt the information to facilitate confirming that the information matches an expected configuration of product 105. In certain embodiments, trust anchor 110 uses ASIC 120's serial number, ECID, and/or product identifier to confirm whether a particular ASIC 120 running on product 105 matches one of the ASICs 120 that the manufacturer has authorized for product 105. Trust anchor 110 detects a problem if ASIC 120 does not match any of the authorized ASICs 120. In response to detecting a problem, trust anchor 110 can stop ASIC 120, initiate a notification to the manufacturer (e.g., via HSM), and/or take other suitable actions. Otherwise, if ASIC 120 passes the posture assessment, trust anchor 110 can allow ASIC 120 to continue running on product 105. In this manner, a particular ASIC 120 that a manufacturer of product 105 authorizes for use with product 105 can be bound to product 105 using trust anchor 110.

Trust anchor 110 can repeat the posture assessment process for each ASIC 120 to be verified. Certain embodiments configure trust anchor 110 to verify all ASICs 120 on product 105. Other embodiments configure trust anchor 110 to verify a subset of ASICs 120, such as ASICs 120 that the manufacturer considers important to verify based on vulnerability of ASIC 120 to gray market modifications, cost of ASIC 120, functionality performed by ASIC 120, whether ASIC 120 has previously passed a posture assessment, and/or other factors. For embodiments where trust anchor 110 verifies multiple ASICs 120, each ASIC 120 has its own LTK, and trust anchor 110 knows all of the LTKs. Trust anchor 110 does not trust any ASIC 120 that cannot communicate with trust anchor 110 using that ASIC 120's respective LTK. In certain embodiments, trust anchor 110 uses the same algorithm (e.g., AEAD algorithm) to generate a respective random value (K) for each ASIC 120. In that case, trust anchor 110 considers ASIC 120 authenticated if and only if ASIC 120 can send a response to trust anchor 110 that is AEAD-Encrypted using its respective random value (K) and the encrypted information that ASIC 120 communicates to trust anchor 110 passes the authentication check.

To avoid security risks, it is important that ASIC 120's LTK does not leak. Examples of techniques for protecting ASIC 120's LTK include choosing the LTK uniformly at random; choosing an LTK of sufficient length (e.g., at least 128 bits) so that an attacker would not be able to guess the LTK in a small number of attempts; establishing procedures to maintain confidentiality of the LTK during the manufacturing process; and protecting the LTK from leaks at runtime. For example, it is important to protect ASIC 120's LTK from side-channel attacks (e.g., attacks based on information that an attacker gains from the system). Some encryption algorithms are more side-channel resistant than others. Advanced Encryption Standard-Galois/Counter Mode (AES-GCM) with a random initialization vector is one example of a side-channel resistant AEAD. Offset Code Book (OCB) is an example of an algorithm that may work well for small circuit sizes. Examples of techniques for protecting ASIC 120's LTK from side channel attacks include minimizing the number of times the LTK is used (e.g., limit the use of LTK to posture assessment), using the LTK only to encrypt random keys (e.g., to avoid known plaintext attacks), and evolving random value (K) over time to minimize exposure. Further examples of techniques for improving side channel resistance are described in "Advanced modes in AES: Are they safe from power analysis based side channel attacks," 2014 IEEE 32nd International Conference on Computer Design (ICCD). Certain embodiments use hash-based signatures to reduce security risks. In addition to the LTK, ASIC 120 may be provisioned with other encryption keys (e.g., public key and private key) for use when ASIC 120 needs to communicate encrypted messages for purposes other than posture assessments.

Certain embodiments may facilitate provisioning product 105. For example, the manufacturer may configure the HSM with information about ASICs 120 that are authorized to run on product 105. When a customer first turns on product 105, trust anchor 110 can perform posture assessments to take an inventory of each ASIC 120 running on product 105. Trust anchor may interact with the HSM to verify that ASICs 120 running on product 105 match HSM's information about ASICs 120 that are authorized to run on product 105. The customer may proceed with provisioning product 105 once ASICs 120 have been verified. If any ASIC 120 cannot be verified by trust anchor 110 (e.g., because ASIC 120 lacks the correct LTK to be able to communicate with trust anchor 110 or because ASIC 120 sends incorrect/unexpected information to trust anchor 110, such as an unexpected serial number, ECID, or product identifier), trust anchor 110 can prevent that ASIC 120 from running and can notify the manufacturer (e.g., via the HSM).

Certain embodiments may facilitate making later manufacturer-approved modifications to product 105. As an example, product 105 may be a modular system comprising a main card that can be expanded by plugging in one or more daughter cards. Even if a customer adds a daughter card to product 105 that was legitimately acquired from the manufacturer, when product 105 boots with the daughter card, trust anchor 110 would detect that the daughter card was not part of the previous inventory of product 105. Trust anchor 110 may then communicate with HSM to confirm that the manufacturer has authorized the daughter card for product 105 and to obtain the LTKs necessary to perform a posture assessment of ASICs 120 running on the daughter card.

Other embodiments prevent making later modifications to product 105. For example, certain embodiments configure trust anchor 110 to support two modes of operation. In the first mode, trust anchor 110 accepts LTKs of new ASICs 120. In the second mode, trust anchor does not accept LTKs of new ASICs 120. Trust anchor 110 may be configured in the first mode during the manufacturing process. Trust anchor 110 can be switched to the second mode prior to shipping product 105 to the customer. In certain embodiments, the manufacturer may further configure trust anchor 110 to support an operation that switches trust anchor 110 from the second mode to the first mode, for example, in the event that the manufacturer needs to expand product 105 (e.g., if the customer later purchases additional capacity) or repair product 105 by replacing an old ASIC 120. Security procedures can be followed to prevent the operation from being performed by anyone other than manufacturer or its authorized agents.

Figure 2:
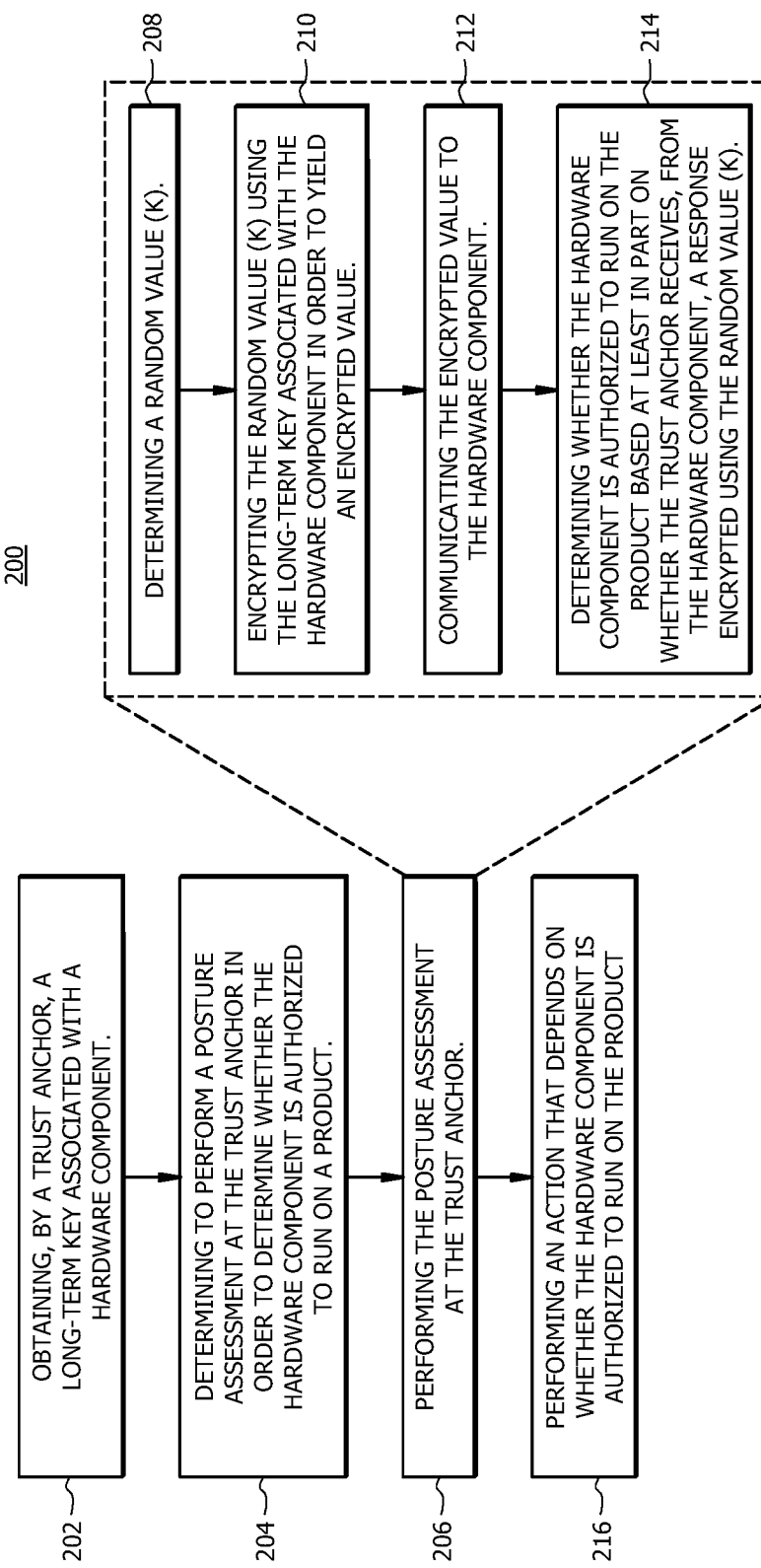
FIG. 2 illustrates an example of a method that may be performed by an ASIC, in accordance with certain embodiments.

FIG. 2 illustrates an example of a method 200 that may be performed by a trust anchor, such as trust anchor 110 described with respect to FIG. 1. In certain embodiments, method 200 begins at step 202 with obtaining, by trust anchor 110, a long-term key (LTK) associated with a hardware component, such as ASIC 120. As described with respect to FIG. 1, trust anchor 110 learns the long-term key in a manner that protects the security of the long-term key. For example, trust anchor 110 obtains the long-term key during manufacturing of product 105 or via a cloud-based HSM associated with the manufacturer of product 105.

Method 200 may proceed to step 204 with determining to perform a posture assessment (at trust anchor 110) in order to determine whether the hardware component is authorized to run on product 105. For example, trust anchor 110 determines to perform the posture assessment in response to booting of product 105, receiving a demand from an operating system of product 105, or receiving a demand from a cloud-based HSM associated with the manufacturer of product 105. In this manner, the posture assessment may be repeated between trust anchor 110 and the hardware component (e.g., each boot time or whenever OS or the HSM determines to demand a posture assessment). Thus, aftermarket changes to hardware components running on product 105 can be detected, which may increase security of product 105 compared to other solutions that only verify hardware components when first provisioning a product.

At step 206, method 200 performs the posture assessment at trust anchor 110 in order to determine whether the hardware component (e.g., ASIC 120), is authorized to run on product 105. In certain embodiments, performing the posture assessment of step 206 comprises the actions of steps 208-214. At step 208, method 200 determines a random value (K), such as the random value (K) described with respect to FIG. 1. At step 210, method 200 encrypts the random value (K) using the long-term key associated with the hardware component (e.g., the LTK obtained in step 202) in order to yield an encrypted value. As an example, the encrypted value may be the ciphertext C described with respect to FIG. 1 (e.g., $C=AEAD\text{-}ENC_{LTK}(K)$). At step 212, method 200 communicates the encrypted value to the hardware component. At step 214, method 200 determines whether the hardware component is authorized to run on product 105 based at least in part on whether trust anchor 110 receives, from the hardware component, a response encrypted using the random value (K). The response from the hardware component may be triggered by sending the encrypted value to the hardware component in step 212 or by sending a subsequent message (such as a request that trust anchor 110 sends to the hardware component after providing hardware component with the encrypted value from which the hardware component is supposed to derive the random value (K)).

In certain embodiments, the outcome of step 214 is determining that the hardware component is not authorized to run on product 105 based on trust anchor 110 failing to receive any response from the hardware component or based on trust anchor 110 receiving an incorrect response (i.e., a response that is not encrypted using the random value (K)). Receiving no response or an incorrect response indicates a risk that the hardware component did not have the correct long-term key required to decrypt the encrypted value sent in step 212, obtain the random value (K), and respond with a response encrypted using the random value (K). A hardware component that does not have the correct long-term key is not authorized to run on product 105.

In certain embodiments, the outcome of step 214 is determining that the hardware component is authorized to run on product 105 based on trust anchor 110 receiving a correct response from the hardware component (i.e., a response that is encrypted using the random value (K)). Receiving the correct response indicates that the hardware component has the correct long-term key required to decrypt the encrypted value sent in step 212, obtain the random value (K), and respond with a response encrypted using the random value (K). In certain embodiments, a hardware component that has the correct long-term key is authorized to run on product 105.

Certain embodiments may further base the outcome of step 214 on other information. For example, even if the hardware component sends the correct response (i.e., a response that is encrypted using the random value (K)), trust anchor 110 may further verify the content of the response received from the hardware component. Trust anchor 110 decrypts the response using the random value (K) in order to obtain the content of the response. In certain embodiments, the content of the response comprises information associated with the hardware component, such a serial number or ECID of the hardware component and/or a product identifier of a product 105 for which the hardware component has been provisioned. A serial number (or ECID) received in the response can be verified by comparing it to a list of serial numbers (or ECIDs) authorized for product 105 to determine if there is a match. A product identifier received in the response can be verified by comparing it to the product ID of product 105 (the product that the hardware component is currently configured on) to determine if there is a match. Trust anchor 110 determines that the hardware component is authorized to run on product 105 if the content of the response passes the verification. Otherwise, trust anchor 110 determines that the hardware component is not authorized to run on product 105 if the content of the response fails the verification.

Method 200 proceeds to step 216 with performing an action that depends on whether the hardware component is authorized to run on product 105. As an example, if the outcome of step 214 is that the hardware component is authorized to run on product 105, the action performed at step 216 may allow the hardware component to run on product 105. In some embodiments, allowing the hardware component to run on product 105 comprises providing the hardware component with information, such as an authorization code or a signal, that enables the hardware component to run on product 105. An example of an authorization code that enables the hardware component to run on product 105 may be an encrypted string value that the hardware component receives, decrypts, and uses in an operation that enables functionality of the hardware component. An example of a signal that enables the hardware component to run on product 105 may comprise a next signal in a message flow (a signal that the hardware component expects during normal operation).

As another example, if the outcome of step 214 is that the hardware component is not authorized to run on product 105, the action performed at step 216 may prevent the hardware component from running on product 105 and/or the action performed at step 216 may report the outcome of step 214 to an HSM or attestation server associated with entity 140. In some embodiments, preventing the hardware component from running comprises abstaining from sending information, such as an authorization code or a signal, that enables the hardware component to run on product 105. Without such information, the hardware component would not be able to run at all, or the hardware component would not be able to run at full capacity, depending on the embodiment. Optionally, trust anchor 110 or the hardware component may prompt a reset in order to retry the posture assessment. The second posture assessment may be successful if the first posture assessment failed for a reason such as a timeout due to a communication or processing error (as opposed to a security problem with the hardware component, such as lack of the correct long term key). In addition, or in the alternative, certain embodiments report the outcome of step 214 to the HSM or attestation server associated with entity 140. When reporting the outcome of step 214 to the HSM or attestation server, certain embodiments may bar the hardware component from running and may later remove the bar if the attestation server responds that the hardware component is authorized to be added to the system. Other embodiments may allow the hardware component to run and may later bar the hardware component if the attestation server responds that the hardware component is not authorized to be added to the system.

In certain embodiments, the action performed at step 216 comprises sending an indication from trust anchor 110 to a second hardware component indicating that the first hardware component is trusted or is not trusted, depending on the outcome of step 214. The second hardware component may then determine whether (or how) to interact with the first hardware component based on whether trust anchor 110 indicated that the first hardware component is trusted.

Certain embodiments may repeat method 200 for multiple hardware components configured on product 105. For example, the hardware component may corresponds to one of a plurality of ASICs 120a-n configured on product 105. The posture assessment may be performed for each ASIC 120, 120b, . . . 120n configured on product 105. In certain embodiments, trust anchor 110 generates an inventory of the plurality of ASICs 120 configured on the product based on performing the posture assessment for each ASIC 120. The inventory can be used in any suitable manner. As an example, the inventory can be reported to the manufacturer. As another example, the inventory can be stored by trust anchor 110 for future posture assessments (e.g., to determine whether any ASICs 120 on product 105 have changed since the inventory was generated).

Certain embodiments determine a new random value (K) for each posture assessment, regardless of whether the posture assessment is being performed for the same hardware component that was subject to a previous posture assessment or the posture assessment is being performed for a different hardware component. This may increase security compared to solutions that use static long-term keys for authentication because static long-term keys are vulnerable to side channel attacks.

Figure 3:
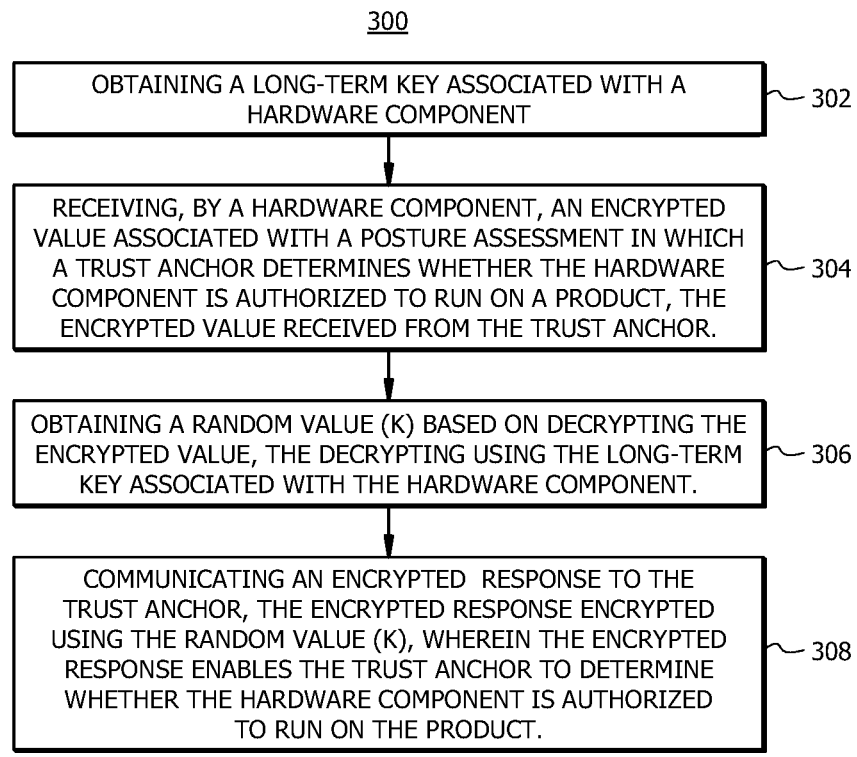
FIG. 3 illustrates an example of a method that may be performed by a trust anchor, in accordance with certain embodiments.

FIG. 3 illustrates an example of a method 300 that may be performed by a hardware component, such as ASIC 120 described with respect to FIG. 1. In certain embodiments, method 300 begins at step 302 with obtaining a long-term key of the hardware component. As an example, the long-term key may be obtained during manufacturing of the hardware component. As another example, the long-term key may be obtained by generating the long-term key using PUF technology. Certain embodiments encrypt the long-term key and provide the long-term key to trust anchor 110 via a cloud-based HSM. Alternatively, trust anchor 110 may obtain the long-term key during manufacturing (in which case it might not be necessary for the hardware component to provide its long-term key to trust anchor 110).

At step 304, method 300 comprises receiving, by the hardware component, an encrypted value from trust anchor 110. The encrypted value is associated with a posture assessment in which trust anchor 110 determines whether the hardware component is authorized to run on a product 105. For example, the hardware component receives the encrypted value described in step 212 of FIG. 2. At step 306, method 300 obtains a random value (K) based on decrypting the encrypted value. The decrypting uses the long-term key associated with the hardware component (e.g., the long-term key obtained in step 302). At step 308, the method communicates an encrypted response to trust anchor 110. The encrypted response is encrypted using the random value (K). The hardware component may further use a public key associated with trust anchor 110 to encrypt the encrypted response. The encrypted response may be communicated in one or more messages. For example, the encrypted response may comprise a first encrypted message acknowledging that the hardware component received the encrypted value of step 304 and a second encrypted message comprising further information requested in a subsequent request from trust anchor 110.

The encrypted response sent in step 308 enables trust anchor 110 to determine whether the hardware component is authorized to run on product 105 (the product that the hardware component is currently on). As described with respect to FIGS. 1-2, trust anchor 110 determines whether the hardware component is authorized to run on product 105 based at least in part on whether the hardware component is able to communicate messages encrypted using the random value (K) (which indicates that the hardware component has the correct long-term key to be able to obtain the random value (K) in step 306). In some embodiments, the trust anchor 110 determines whether the hardware component is authorized to run on product 105 based on verifying further information contained in the encrypted response communicated in step 308. To facilitate this verification, the hardware component can include a component identifier of the hardware component, such as a serial number or ECID, and/or a product identifier of a product on which the hardware component has been provisioned to run (i.e., a product on which the hardware component is authorized to run). As described above, trust anchor 110 can compare the serial number (or ECID) received in the response to a list of serial numbers (or ECIDs) authorized for product 105 to determine if there is a match. Similarly, trust anchor 110 can compare the product identifier received in the response to the product ID of product 105 (the product that the hardware component is currently configured on) to determine if there is a match.

Certain embodiments minimize the cryptographic operations that need to be performed by the hardware component (e.g., ASIC 120) so that more of the hardware component's capacity can be used for product-related functionality. As an example, in certain embodiments, the hardware component need not use public key based cryptographic identity in order to identify the hardware component.

Figure 4:
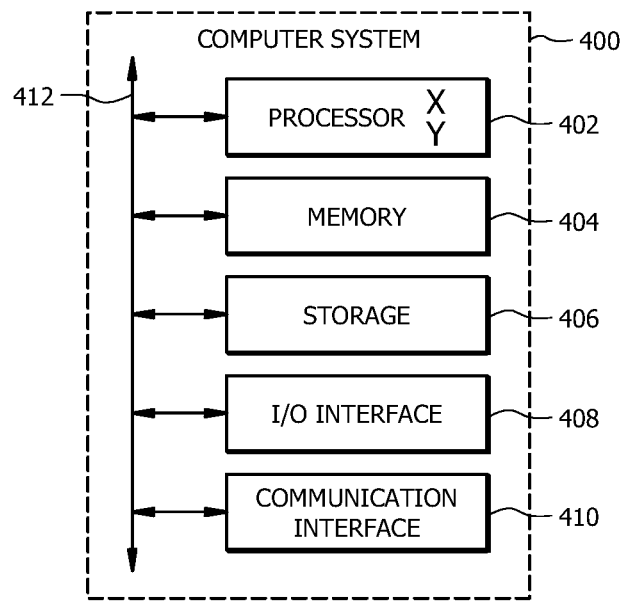
FIG. 4 illustrates an example of a computer system, in accordance with certain embodiments.

FIG. 4 illustrates an example computer system 400. In certain embodiments, any of product 105, trust anchor 110, ASIC 120, entity 140, or components of any of the preceding, may be implemented using a computer system 400 or one or more components of computer system 400. In particular embodiments, one or more computer systems 400 perform one or more steps of one or more methods described or illustrated herein, such as one or more steps of the method described with respect to FIGS. 1-3. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes processing circuitry (e.g., processor 402), memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In certain embodiments, processor 402 may include one or more modules to facilitate the functionality described herein. As an example, processor 402 of trust anchor 110 may comprise an encryption module X configured to facilitate encrypted communication with one or more ASICs 120 and a verification module Y configured to verify whether the ASICs 120 have been authorized for use in product 105. As another example, processer 402 of ASIC 120 may comprise an encryption module X configured to facilitate encrypted communication with trust anchor 110 and a product functionality module Y configured to perform ASIC 120's usual product-related functionality.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example, and not by way of limitation, computer system 400 may communicate with network 130 of FIG. 1, which may comprise an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As described above with respect to FIGS. 1-3, certain embodiments allow for binding a hardware component, such as ASIC 120, to a trust anchor 110. Once the binding has been performed, certain embodiments use trust anchor 110 to control functionality performed by the hardware component. This scenario might arise if a manufacturer uses the same hardware component in different products 105, but configures the hardware components differently in different products. For example, one product 105 may have a higher price point and more functionality enabled. Trust anchor 110 can be used to prevent certain functionality from being enabled in a product 105 that is not supposed to have that functionality.

In order for trust anchor 110 to control functionality performed by the hardware component, certain embodiments provision trust anchor 110 with a schema indicating functionality for which the hardware component has been authorized. As examples, trust anchor 110 may be provisioned with the schema at the time of manufacturing, or trust anchor 110 may learn the schema via the HSM. As an example, in certain embodiments, a schema may indicate a configuration of ports that the hardware component is authorized to use. Suppose a product 105 comprises 48 ports. The schema may indicate that the hardware component is authorized to use all 48 ports or that the hardware component is authorized to use only a subset of ports, such as 24 ports.

During operation of product 105, trust anchor 110 and the hardware component perform a binding procedure to establish a key value K. Examples of binding procedures are described above with respect to FIGS. 1-3. Trust anchor 110 then sends the schema containing functional enablement to the hardware component using the key value K. Prior to receiving the schema, functionality of the hardware component is disabled. Continuing with the example above where the schema indicates ports that the hardware component is authorized to use, the hardware component might not be able to use any ports or might only be able to use a minimum number of ports, such as ports associated with basic bootup functionality, trust anchor binding, and the like. After receiving the schema, the hardware component selectively enables functionality authorized by the received schema. Because certain hardware component functionality is disabled until the hardware component obtains the schema from trust anchor 110, an unauthorized source is prevented from using that hardware component functionality in a completely cloned system that does not include any trust anchor 110.

Additionally, binding can be performed at the system level to prevent a hardware component from being moved from one product 105 to another. The product 105 may be identified at any suitable level of granularity. As an example, product 105 could be a particular switch, router, etc., or product 105 could be a component thereof, such as a particular board within the switch, router, etc. Binding the hardware component with product 105 may prevent the hardware component from being harvested from scrap boards to be used to create a new counterfeit product 105.

In order for the hardware component to ascertain that it is operating on the correct product 105, a challenge-response mechanism may be used. For example, the hardware component may be configured to generate a challenge and send the challenge to trust anchor 110. Trust anchor 110 receives the challenge from the hardware component, signs it, and sends the signed response to the hardware component. The response indicates the identity of product 105 on which the hardware component is currently running. The hardware component receives the signed response and validates that it received its own challenge back along with the identity of the product 105 on which it is currently running. The hardware component can compare the identity of the product 105 on which it is currently running with the identity of a product 105 that the hardware component is provisioned to run on (e.g., based on provisioning obtained at the time of manufacture of the hardware component) to ensure that the identities match. If the board identities do not match, the hardware component ceases running on the board.

As an alternative to the challenge-response described in the previous paragraph, certain embodiments simply assume that once the tunnel is established, trust anchor 110 sends the identity of the product 105 to the hardware component using the tunnel. The hardware component can then compare the identity of the product 105 that it is provisioned to run on to the identity of the board that it is currently running on to ensure that board identities match.

Certain embodiments may use system software (e.g., the Operating System of product 105) or a remote server to verify that the hardware component has been authorized. For example, the system software or remove server can deliver independent challenges to the hardware component, receive a response from the hardware component, compare the response to the schema (which may be obtained from trust anchor 110 or other trusted source, such as the HSM), and compare the hardware component's response to the schema to confirm whether the hardware component has been authorized to perform certain functionality, run on a particular product 105, etc.

Figure 5:
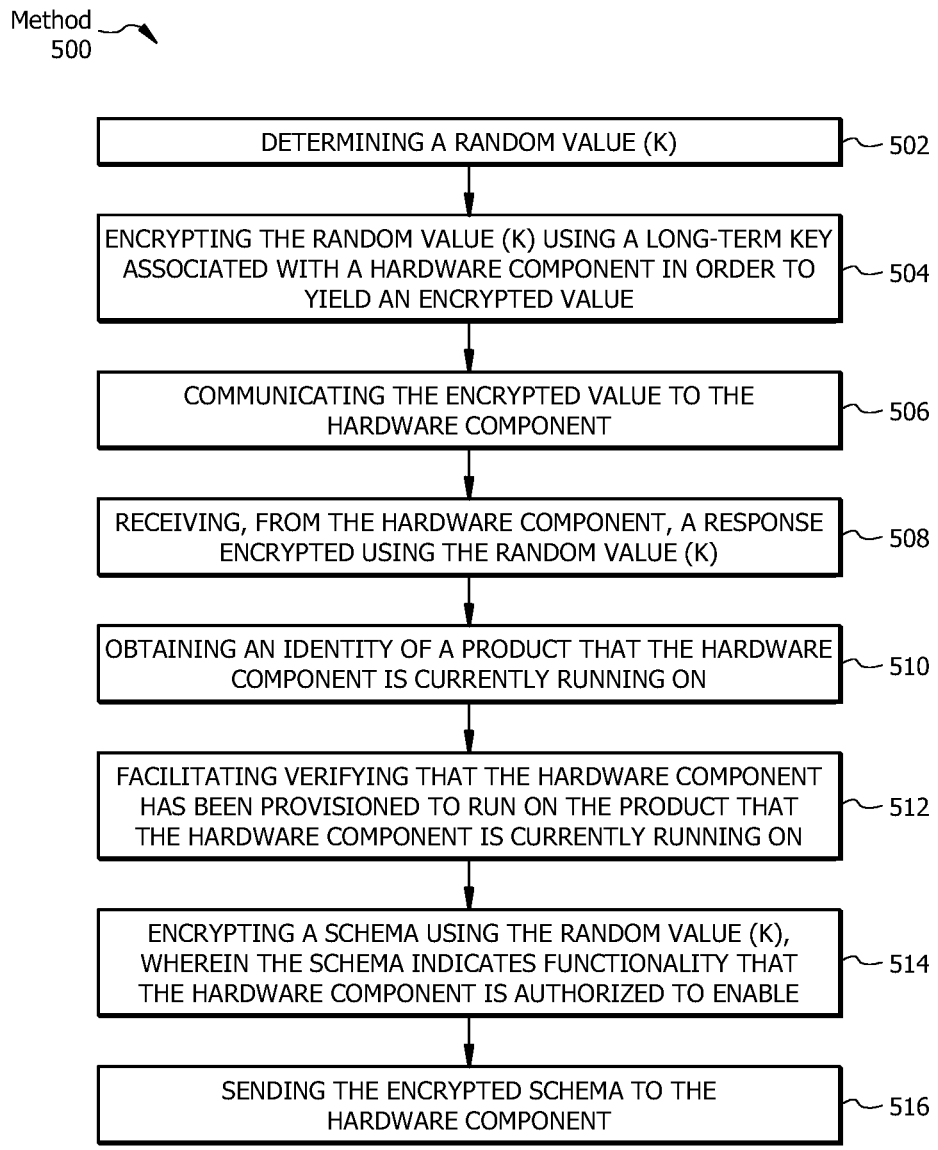
FIG. 5 illustrates an example of a method that may be performed by a trust anchor, in accordance with certain embodiments.

FIG. 5 illustrates an example of a method 500 that may be performed by trust anchor 110 to control functionality performed by a hardware component (e.g., ASIC 120). Method 500 begins at step 502 with determining a random value (K) (similar to step 208 of FIG. 2). Method 500 proceeds to step 504 with encrypting the random value (K) using a long-term key associated with a hardware component in order to yield an encrypted value (similar to step 210 of FIG. 2). Method 500 continues to step 506 with communicating the encrypted value to the hardware component (similar to step 212 of FIG. 2). At step 508, method 500 receives, from the hardware component, a response encrypted using the random value (K) (similar to step 214 of FIG. 2). In this manner, a binding is established between trust anchor 110 and the hardware component.

As noted above, in certain embodiments, binding can be performed at the system level to prevent a hardware component from being moved from one product 105 to another. Thus, in some embodiments, method 500 may comprise the steps of obtaining an identity of a product 105 that the hardware component is currently running on (step 510) and facilitating verifying that the hardware component has been provisioned to run on the product 105 that the hardware component is currently running on (step 512). Examples of products 105 may include a switch, a router, a board, etc. Certain embodiments send the identity of the product 105 that the hardware component is currently running on to the hardware component for verification by the hardware component. Other embodiments receive an identity of a product 105 that the hardware component is provisioned to run on from the hardware component and then verify, by the trust anchor, whether the identity of the product 105 that the hardware component is provisioned to run on matches the identity of the product 105 that the hardware component is currently running on. For example, the identity of the product 105 that the hardware component is provisioned to run on may be received in a challenge from the hardware component and, in response to verifying that the identity of the product 105 that the hardware component is provisioned to run on matches the identity of the product 105 that the hardware component is currently running on, the trust anchor 110 may send the hardware component a signed response to the challenge.

Once the binding is established, the trust anchor can control functionality performed by the hardware component.

For example, the method continues to step 514 with encrypting a schema using the random value (K) and then to step 516 with sending the encrypted schema from the trust anchor to the hardware component. The schema indicates functionality that the hardware component is authorized to enable. As an example, as described above, the schema may indicate a configuration of ports that the hardware component is authorized to use. Trust anchor 110 may have obtained the schema in any suitable manner (e.g., during manufacturing of the trust anchor, via a cloud-based HSM, etc.). In certain embodiments, sending the schema in step 516 is accomplished by including the schema in a signed response to a challenge from the hardware component. For example, as described above, the hardware component may initiate a challenge-response in order to verify that the hardware component is running on a product 105 that it has been provisioned to run on.

In certain embodiments, method 500 may further facilitate verification of the hardware component by a remote server or system software of the product 105 on which the hardware component is running. For example, method 500 may further comprise receiving, by trust anchor 110, a request for the schema. The request is received from the remote server (such as an attestation server or an HSM associated with entity 140) or from the system software (such as an operating system of product 105). In response, method 500 provides the schema associated with the hardware component to the remote server or the system software. Providing the schema enables the remote server or system software to ensure the hardware component functions according to the schema.

Method 500 may be modified in any suitable manner, depending on the embodiment. As an example, certain embodiments may omit steps 510 and 512. As another example, certain embodiments may omit steps 514 and 516. The scope of this disclosure encompasses all changes, substitutions, variations, alterations, and modifications that a person having ordinary skill in the art would comprehend.

Figure 6:
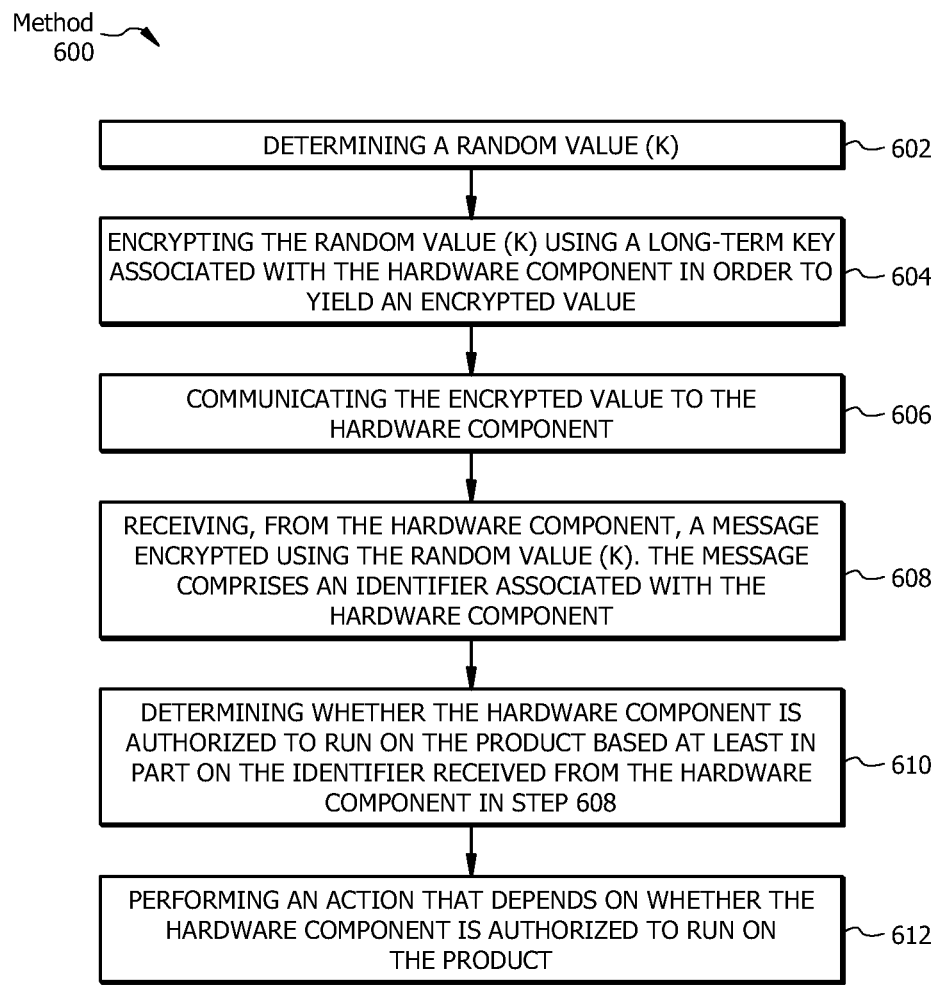
FIG. 6 illustrates an example of a method that may be performed by a trust anchor, in accordance with certain embodiments.

FIG. 6 illustrates an example of a method 600 that may be performed by trust anchor 110 to verify a hardware component (e.g., ASIC 120). Method 600 begins with performing a posture assessment at trust anchor 110 in order to determine whether the hardware component is authorized to run on a product 105. Performing the posture assessment comprises determining a random value (K) (step 602), encrypting the random value (K) using a long-term key associated with the hardware component in order to yield an encrypted value (step 604), and communicating the encrypted value to the hardware component (step 606). Steps 602, 604, and 606 of FIG. 6 are analogous to steps 208, 210, and 212 of FIG. 2, respectively.

As shown in step 608, performing the posture assessment further comprises receiving, from the hardware component, a message encrypted using the random value (K). The message comprises an identifier associated with the hardware component. As an example, in certain embodiments, the identifier associated with the hardware component comprises an ECID of the hardware component. As another example, in certain embodiments, the identifier associated with the hardware component comprises an identity of a product that the hardware component is provisioned to run on.

The method proceeds to step 610 wherein performing the posture assessment further comprises determining whether the hardware component is authorized to run on product 105. The determining is based at least in part on the identifier received from the hardware component in step 608 (i.e., the identifier associated with the hardware component). As an example, certain embodiments compare the identifier received from the hardware component in step 608 to one or more authorized identifiers. In certain embodiments, each authorized identifier corresponds to an identifier read from a respective authorized hardware component and imprinted on the trust anchor during manufacturing of product 105. Trust anchor 110 determines that the hardware component is authorized to run on product 105 based at least in part on the identifier received in step 608 matching one of the authorized identifiers. Trust anchor 110 determines that the hardware component is not authorized to run on product 105 based at least in part on the identifier received in step 608 failing to match one of the authorized identifiers.

As an example, the identifier received in step 608 may be an ECID of the hardware component, and the one or more authorized identifiers may be authorized ECIDs. Trust anchor 110 may have obtained the authorized ECIDs during manufacture of product 105. For example, a hardware component (such as ASIC 120) may be programmed with an ECID during manufacturing of the hardware component. During manufacturing of product 105, the ECID of each hardware component authorized to run on product 105 may be read from the respective hardware component (e.g., via a JTAG port) and imprinted on trust anchor 110. The ECIDs imprinted on trust anchor 110 may be considered authorized ECIDs. Trust anchor 110 compares the ECID received from the hardware component in step 608 to determine whether it matches one of the authorized ECIDs. Trust anchor 110 determines that the hardware component is authorized to run on product 105 based at least in part on the ECID of the hardware component matching one of the authorized ECIDs. Trust anchor 110 determines that the hardware component is not authorized to run on product 105 based at least in part on the ECID of the hardware component failing to match one of the authorized ECIDs.

In addition, or in the alternative, in certain embodiments, determining whether the hardware component is authorized to run on product 105 at step 610 comprises determining whether the identity of the product 105 that the hardware component is provisioned to run on matches an identity of the product 105 that the hardware component is currently running on. In such embodiments, trust anchor 110 determines that the hardware component is authorized to run on product 105 based at least in part on the identity of the product 105 that the hardware component is provisioned to run on matching the identity of the product 105 that the hardware component is currently running on. Trust anchor 110 determines that the hardware component is not authorized to run on product 105 based at least in part on the identity of the product 105 that the hardware component is provisioned to run on failing to match the identity of the product 105 that the hardware component is currently running on.

After determining whether the hardware component is authorized to run on product 105, method 600 proceeds to step 612 with performing an action that depends on whether the hardware component is authorized to run on the product. As an example, trust anchor 110 may allow the hardware component to run on product 105 in response to determining that the hardware component is authorized to run on product 105, or trust anchor 110 may prevent the hardware component from running on product 105 in response to determining that the hardware component is not authorized to run on product 105. As discussed above, allowing the hardware component to run on product 105 may comprises sending the hardware component an authorization code, a signal, and/or a schema that enables the hardware component to run on product 105. Preventing the hardware component from running on product 105 may comprise withholding/abstaining from sending the authorization code, signal, and/or schema that enables the hardware component to run on product 105.

In certain embodiments, the action performed in step 612 comprises providing an attestation to a recipient in response to determining that the hardware component is authorized to run on product 105. The attestation indicates to the recipient that the hardware component is authorized to run on the product. As an example, in certain embodiments, the recipient may be a customer of product 105 or a manufacturer of product 105. The attestation may confirm to the recipient that the hardware component (e.g., ASIC 120) has not been counterfeited or swapped out in the supply chain.

In summary, the method of FIG. 6 allows trust anchor 110 to learn authorized identifiers (e.g., ECIDs) during the manufacturing process. Then, during operation of product 105, trust anchor 110 can perform a binding procedure to establish the random value (K) (e.g., steps 602, 604, 606). Following the derivation of random value (K), the ECID of the hardware component can be delivered securely from the hardware component to trust anchor 110. For example, as discussed with respect to step 608, trust anchor 110 receives the identifier from the hardware component in a message encrypted using the random value (K)). Trust anchor 110 can then evaluate the identifier received from the hardware component to determine whether it matches an authorized identifier (step 610). Trust anchor 110 performs an action based on whether the hardware component is authorized to run on product 105.

Certain examples throughout this disclosure have been described with reference to the roll of a manufacturer. The manufacturer may generally refer to an entity with permission to authorize a hardware component (e.g., ASIC 120) to run on a product 105 and/or an entity seeking to protect product 105 from running unauthorized hardware components. In certain embodiments, the manufacturer may be an entity that handles the physical manufacture of product 105. In certain embodiments, the manufacturer may be a developer/owner of a product line that grants another entity permission to handle the physical manufacture of product 105, for example, according to terms of an original equipment manufacturer (OEM) agreement. In certain embodiments, the manufacturer may comprise multiple entities. For example, a first entity may be the developer/owner of the product line, and the second entity may be an OEM entity. The first entity may manage steps performed by a cloud-based HSM (such as triggering a posture assessment or facilitating encrypted communication), and the second entity may manage steps that occur during manufacture of product 105 (such as configuring ASIC 120 with a long-term key and sharing the long-term key with trust anchor 110).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular directed to a method, a storage medium, a system and a computer program product, wherein any feature mentioned in one category, e.g. method, can be applicable in another category, e.g. system, as well. The various features disclosed herein may be combined or separated in any suitable manner.

The invention claimed is:

1. A system, comprising:
one or more processors; and
one or more computer-readable non-transitory storage media, the one or more computer-readable non-transitory storage media comprising instructions that, when executed by the one or more processors, cause one or more components of the system to perform operations comprising:
performing a posture assessment at a trust anchor to determine whether a hardware component is authorized to run on a product at a boot time of the product, wherein performing the posture assessment comprises:
determining a random value (K) associated with the product for a specific boot session;
obtaining a long-term key associated with the hardware component, the long-term key being provided by the hardware component or the product;
encrypting the random value (K) with the long-term key associated with the hardware component in order to yield an encrypted value, wherein:
the hardware component decrypts the encrypted value to confirm the random value (k); and
in response to determining that the long-term key is the long-term key associated with the hardware component, the hardware component confirms that the trust anchor is authorized to run on the product;
communicating the encrypted value to the hardware component; and
determining whether the hardware component is authorized to run on the product based at least in part on whether the trust anchor receives a response encrypted using the random value (K) from the hardware component; and performing an action that depends on whether the hardware component is authorized to run on the product.

2. The system of claim 1, wherein the operations further comprise:
obtaining, by the trust anchor, the long-term key associated with the hardware component during manufacturing of the product.

3. The system of claim 1, wherein the operations further comprise:
obtaining, by the trust anchor, the long-term key associated with the hardware component via a cloud-based hardware security module (HSM).

4. The system of claim 1, wherein the operations further comprise:
determining to perform the posture assessment in response to a demand from an operating system of the product.

5. The system of claim 1, wherein the operations further comprise:
determining to perform the posture assessment in response to a demand from a cloud-based hardware security module (HSM).

6. The system of claim 1, wherein:
the hardware component corresponds to one of a plurality of application-specific integrated circuits (ASICs) configured on the product; and
the operations further comprise:
performing the posture assessment for each ASIC configured on the product; and
generating an inventory of the plurality of ASICs configured on the product based on performing the posture assessment for each ASIC.

7. The system of claim 1, wherein performing the action that depends on whether the hardware component is authorized to run on the product comprises:
sending the hardware component a signal or an authorization code that enables the hardware component to run on the product in response to determining that the hardware component is authorized to run on the product.

8. A method, comprising:
performing a posture assessment at a trust anchor to determine whether a hardware component is authorized to run on a product at a boot time of the product, wherein performing the posture assessment comprises:
determining a random value (K) associated with the product for a specific boot session;
obtaining a long-term key associated with the hardware component, the long-term key being provided by the hardware component or the product;
encrypting the random value (K) with the long-term key associated with the hardware component in order to yield an encrypted value, wherein:
the hardware component decrypts the encrypted value to confirm the random value (k); and
in response to determining that the long-term key is the long-term key associated with the hardware component, the hardware component confirms that the trust anchor is authorized to run on the product;
communicating the encrypted value to the hardware component; and
determining whether the hardware component is authorized to run on the product based at least in part on whether the trust anchor receives a response encrypted using the random value (K) from the hardware component; and performing an action that depends on whether the hardware component is authorized to run on the product.

9. The method of claim 8, further comprising:
obtaining, by the trust anchor, the long-term key associated with the hardware component during manufacturing of the product.

10. The method of claim 8, further comprising:
obtaining, by the trust anchor, the long-term key associated with the hardware component via a cloud-based hardware security module (HSM).

11. The method of claim 8, further comprising:
determining to perform the posture assessment in response to one or more of the following:
receiving a demand from an operating system of the product; or
receiving a demand from a cloud-based hardware security module (HSM).

12. The method of claim 8, wherein the hardware component corresponds to one of a plurality of application-specific integrated circuits (ASICs) configured on the product, and wherein the method further comprises:
performing the posture assessment for each ASIC configured on the product; and
generating an inventory of the plurality of ASICs configured on the product based on performing the posture assessment for each ASIC.

13. The method of claim 8, wherein performing the action that depends on whether the hardware component is authorized to run on the product comprises:
abstaining from sending the hardware component a signal or an authorization code that enables the hardware component to run on the product in response to determining that the hardware component is not authorized to run on the product.

14. One or more computer-readable non-transitory storage media embodying instructions that, when executed by a processor, cause the performance of operations including:
performing a posture assessment at a trust anchor to determine whether a hardware component is authorized to run on a product at a boot time of the product, wherein performing the posture assessment comprises:
determining a random value (K) associated with the product for a specific boot session;
obtaining a long-term key associated with the hardware component, the long-term key being provided by the hardware component or the product;
encrypting the random value (K) with the long-term key associated with the hardware component in order to yield an encrypted value, wherein:
the hardware component decrypts the encrypted value to confirm the random value (k); and
in response to determining that the long-term key is the long-term key associated with the hardware component, the hardware component confirms that the trust anchor is authorized to run on the product;
communicating the encrypted value to the hardware component; and
determining whether the hardware component is authorized to run on the product based at least in part on whether the trust anchor receives a response encrypted using the random value (K) from the hardware component; and performing an action that depends on whether the hardware component is authorized to run on the product.

15. The one or more computer-readable non-transitory storage media of claim 14, wherein the operations further comprise:
obtaining, by the trust anchor, the long-term key associated with the hardware component during manufacturing of the product.

16. The one or more computer-readable non-transitory storage media of claim 14, wherein the operations further comprise:
obtaining, by the trust anchor, the long-term key associated with the hardware component via a cloud-based hardware security module (HSM).

17. The one or more computer-readable non-transitory storage media of claim 14, wherein the operations further comprise determining to perform the posture assessment in response to one or more of the following:
receiving a demand from an operating system of the product; or
receiving a demand from a cloud-based hardware security module (HSM).

18. The one or more computer-readable non-transitory storage media of claim 14, wherein the hardware component corresponds to one of a plurality of application-specific integrated circuits (ASICs) configured on the product, and wherein the operations further comprise:
performing the posture assessment for each ASIC configured on the product; and
generating an inventory of the plurality of ASICs configured on the product based on performing the posture assessment for each ASIC.

19. The one or more computer-readable non-transitory storage media of claim 14, wherein performing the action that depends on whether the hardware component is authorized to run on the product comprises:
sending the hardware component a signal or an authorization code that enables the hardware component to run on the product in response to determining that the hardware component is authorized to run on the product.

* * * * *